(12) United States Patent
Card

(10) Patent No.: US 10,333,260 B2
(45) Date of Patent: Jun. 25, 2019

(54) HIGH CONTACT RESISTANCE DETECTION

(71) Applicant: FAIRCHILD SEMICONDUCTOR CORPORATION, Sunnyvale, CA (US)

(72) Inventor: Robert A. Card, Scarborough, ME (US)

(73) Assignee: Semiconductor Components Industries, LLC, Phoenix, AZ (US)

( * ) Notice: Subject to any disclaimer, the term of this patent is extended or adjusted under 35 U.S.C. 154(b) by 118 days.

(21) Appl. No.: 15/678,713

(22) Filed: Aug. 16, 2017

(65) Prior Publication Data
US 2018/0062326 A1 Mar. 1, 2018

Related U.S. Application Data

(60) Provisional application No. 62/382,162, filed on Aug. 31, 2016.

(51) Int. Cl.
| | |
|---|---|
| *G06F 13/10* | (2006.01) |
| *H01R 13/66* | (2006.01) |
| *H01R 12/72* | (2011.01) |
| *H01R 12/70* | (2011.01) |
| *G06F 13/42* | (2006.01) |
| *G06F 13/38* | (2006.01) |
| *G06F 1/26* | (2006.01) |
| *G06F 1/3206* | (2019.01) |

(Continued)

(52) U.S. Cl.
CPC ......... *H01R 13/6683* (2013.01); *G06F 1/266* (2013.01); *G06F 1/3206* (2013.01); *G06F 13/385* (2013.01); *G06F 13/4282* (2013.01); *H01R 12/7088* (2013.01); *H01R 12/725* (2013.01); *H01R 24/60* (2013.01); *H01R 2107/00* (2013.01); *Y02D 10/14* (2018.01); *Y02D 10/151* (2018.01)

(58) Field of Classification Search
None
See application file for complete search history.

(56) References Cited

U.S. PATENT DOCUMENTS

| | | | | |
|---|---|---|---|---|
| 6,963,933 B2* | 11/2005 | Saito | ....................... | G06F 1/263 |
| | | | | 710/1 |
| 7,679,317 B2* | 3/2010 | Veselic | ................... | G06F 1/266 |
| | | | | 320/106 |

(Continued)

OTHER PUBLICATIONS

Hewlett-Packard Inc. et al., "USB 3.1 Legacy Cable and Connector Specification," Rev. 1.0, Sep. 22, 2017, 74 pages.

(Continued)

*Primary Examiner* — Cheng Yuan Tseng
(74) *Attorney, Agent, or Firm* — Brake Hughes Bellermann LLP

(57) ABSTRACT

A device includes an interface configured to couple a power source to the device. The interface includes a plurality of contacts including at least one first contact configured to couple a voltage bus of the power source to a voltage bus of the device, and at least one second contact configured to couple the voltage bus of the power source to a secondary bus of the device. The device further includes a detector configured to determine a contact resistance of the at least one first contact based on a first current associated with the voltage bus and a second current associated with the secondary bus.

20 Claims, 4 Drawing Sheets

(51) Int. Cl.
*H01R 24/60* (2011.01)
*H01R 107/00* (2006.01)

(56) References Cited

U.S. PATENT DOCUMENTS

| | | | | |
|---|---|---|---|---|
| 8,830,073 B2* | 9/2014 | Sims | ............... | G06F 1/3203 |
| | | | | 320/107 |
| 9,030,208 B2* | 5/2015 | Shoykhet | ........... | G06F 13/4081 |
| | | | | 324/538 |
| 9,122,813 B2* | 9/2015 | Oljaca | ............... | G06F 13/4081 |
| 9,419,452 B2* | 8/2016 | Toivanen | ............ | H02J 7/0036 |
| 9,711,983 B2* | 7/2017 | Winger | ............. | H02J 7/0052 |
| 9,800,078 B2* | 10/2017 | Liu | ............... | H02J 7/008 |
| 9,923,358 B2* | 3/2018 | Tao | ............... | H02H 1/0007 |
| 9,923,451 B2* | 3/2018 | Ye | ............... | H02M 1/14 |
| 10,114,781 B2* | 10/2018 | Whitby-Strevens | ........... | |
| | | | | G06F 13/385 |

OTHER PUBLICATIONS

Apple Inc. et al., Universal Serial Bus Type-C Cable and Connector Specification, Release 1.3, Jul. 14, 2017, 241 pages.
Bob Dunstan et al., "Universal Serial Bus Power Delivery Specification," Rev. 3.0, Ver. 1.1, Jan. 12, 2017, 579 pages.
Hewlett-Packard Company et al., "Universal Serial Bus Type-C™ Port Controller Interface Specification," Rev. 2.0, Ver. 1.0, Oct. 2017, 103 pages.

\* cited by examiner

HIGH CONTACT RESISTANCE DETECTION

RELATED APPLICATION

This application claims priority to and the benefit of U.S. Provisional Application No. 62/382,162, entitled, "TYPE C HIGH CONTACT RESISTANCE POLLUTION DETECTION," filed Aug. 31, 2016, which is incorporated herein by reference in its entirety.

FIELD

Embodiments relate to detecting contact resistance in a Universal Serial Bus (USB) connector contact.

BACKGROUND

USB Type-C is a USB connector type that allows for higher voltage and current capabilities than previous USB connector types. Due to the increased current capabilities, connector contact resistance can be a concern because of the potential for increased heat associated with an increase in power dissipation in the connector contact. Excessive contact resistance can cause over heating of the USB connector, resulting in possibly melting of the plastic components of the USB connector and/or damage to the coupled computing device.

SUMMARY

In at least one general aspect, a device includes an interface configured to couple a power source to the device. The interface includes a plurality of contacts including at least one first contact configured to couple a voltage bus of the power source to a voltage bus of the device, and at least one second contact configured to couple the voltage bus of the power source to a secondary bus of the device. The device further includes a detector configured to determine a contact resistance of the at least one first contact based on a first current associated with the voltage bus and a second current associated with the secondary bus.

In another general aspect, a method includes detecting a bus voltage on a first side of a contact of a connector interface, detecting the bus voltage on a second side of the contact of the connector interface, determining a voltage drop based on the bus voltage on the first side of the contact and the bus voltage on the second side of the contact, and reducing a current drawn from a power source based on the voltage drop.

In yet another general aspect, a USB TYPE-C connector includes a voltage bus trace coupled to a voltage bus of a power source, and an interface configured to couple the power source to a device. The interface includes a plurality of contacts the plurality of contacts include at least one voltage bus contact configured to couple the voltage bus trace to a voltage bus of the device, and at least one contact configured to couple the voltage bus trace to a secondary bus of the device.

Implementations can include one or more of the following features. For example, the detector can be configured to generate a voltage drop generated based on a current associated with the voltage bus and a current associated with the secondary bus, determine if the voltage drop exceeds a reference value, and in response to determining the voltage drop exceeds the reference value, trigger a reduction of a current drawn from the power source. The detector can include a current sense amplifier configured to generate a voltage drop generated based on a current associated with the voltage bus and a current associated with the secondary bus, and a comparator configured to compare the voltage drop to a reference value, and communicate a result of the comparing of the voltage drop to the reference value to a processor.

For example, the device can further include a battery, a switching charger configured to reduce a voltage to a level supported by the battery, a bypass switch configured to bypass the switching charger, and a processor configured to select the switching charger or the bypass switch based on a voltage associated with the power source. The interface can use a universal serial bus (USB) TYPE-C standard. The device can further include a processor configured to determine an amount of current to draw from the power source based on a capability signal received from the power source, instruct one of a switching charger or a bypass switch to draw the amount of current from the power source, and instruct one of the switching charger or the bypass switch to reduce the amount of current to draw from the power source based on a communication received from the detector.

For example, the device can further include a processor configured to instruct one of a switching charger or a bypass switch to draw current from the power source, and instruct one of the switching charger or the bypass switch to terminate the drawing of the current from the power source based on a communication received from the detector. The secondary bus can include a high impedance input to the detector. The device can further include a processor configured to cause a coupling and decoupling of a voltage bus trace associated with the voltage bus of the power source to the secondary bus of the device.

Implementations can include one or more of the following features. For example, the method can include comparing the voltage drop to a reference voltage. The voltage drop can correspond to a contact resistance of the contact. The contact can be a first contact, the method further includes one of coupling or decoupling the bus voltage to a second contact on the second side of the contact. The method can include comparing the voltage drop to a reference value, and communicating a result of the comparing of the voltage drop to the reference value to a processor. The method can include determining if the voltage drop exceeds a reference value, and in response to determining the voltage drop exceeds the reference value, triggering the reducing of the current drawn from the power source. The method can include determining if the voltage drop exceeds a reference value, and in response to determining the voltage drop exceeds the reference value, terminating the current draw from the power source. The method can include selecting one of a switching charger or a bypass switch for use in charging a battery based on a voltage associated with the power source.

Implementations can include one or more of the following features. For example, the USB TYPE-C connector can include a switch configured to couple the voltage bus trace to the at least one contact.

Figure 1:
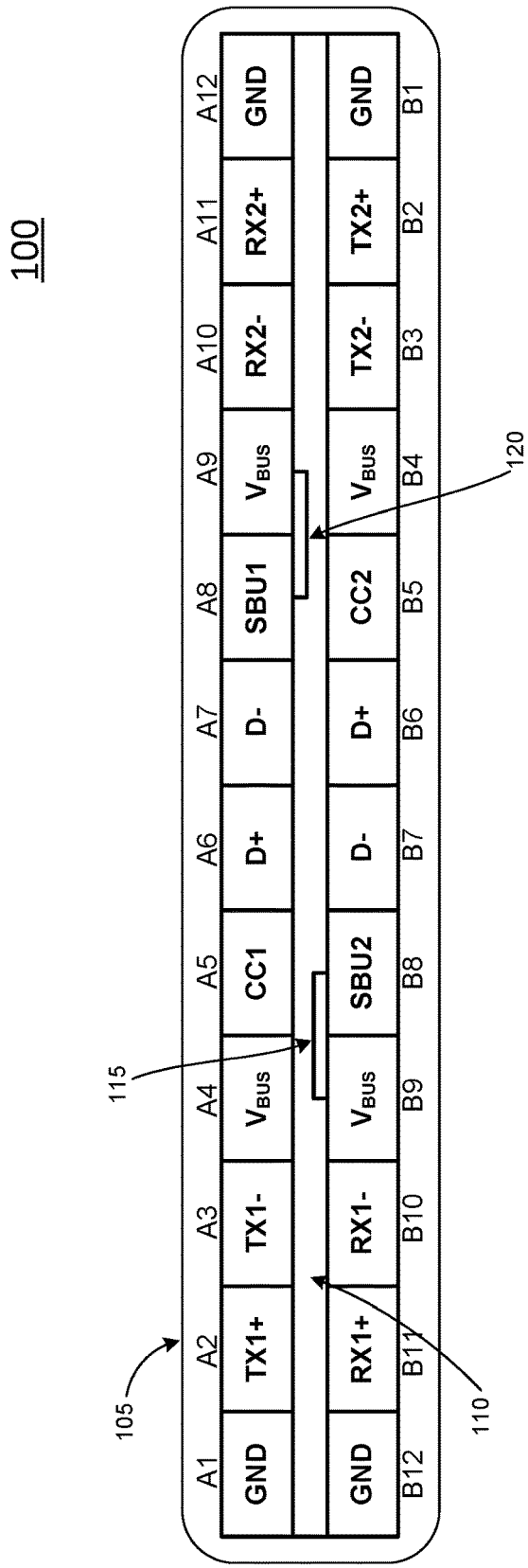
FIG. 1 is a block diagram illustrating a structure of a serial interface according to at least one example embodiment.

It should be noted that these Figures are intended to illustrate the general characteristics of methods, structure and/or materials utilized in certain example embodiments and to supplement the written description provided below. These drawings are not, however, to scale and may not precisely reflect the precise structural or performance characteristics of any given embodiment, and should not be interpreted as defining or limiting the range of values or properties encompassed by example embodiments. For example, the relative positioning of regions and/or structural elements may be reduced or exaggerated for clarity. The use of similar or identical reference numbers in the various drawings is intended to indicate the presence of a similar or identical element or feature.

DETAILED DESCRIPTION OF THE EMBODIMENTS

Overheating of the universal serial bus (USB) connector is typically detected using a temperature measuring device (e.g., thermistor) located proximate to a contact or on the body of the USB connector. However, temperature measuring devices can provide temperature readings too slowly for a computing device to take action (e.g., reduce current) to prevent damage to components of the USB connector and/or damage to the coupled computing device.

In example embodiments described herein, a modified USB connector can be configured to allow the coupled computing device to determine a contact resistance of the USB connector. The coupled computing device can include components configured to determine contact resistance using a modified (e.g., as compared to a standard) USB connector. Further, the computing device can be configured to take action (e.g., execute a process) to prevent overheating of the USB connector based on the determined contact resistance (e.g., without using a temperature measuring device). Thus preventing damage to components of the USB connector and/or damage to the coupled computing device due to overheating.

While example embodiments may include various modifications and alternative forms, embodiments thereof are shown by way of example in the drawings and will herein be described in detail. It should be understood, however, that there is no intent to limit example embodiments to the particular forms disclosed, but on the contrary, example embodiments are to cover all modifications, equivalents, and alternatives falling within the scope of the claims. Like numbers refer to like elements throughout the description of the figures.

FIG. 1 is a block diagram illustrating a structure of serial interface according to at least one example embodiment. The serial interface can include a plurality of contacts and be configured to couple a power source to a device. The plurality of contacts can include at least one voltage bus contact configured to couple a voltage bus trace to a voltage bus of the device, and at least one contact configured to couple the voltage bus trace to a secondary bus of the device. The device can include a detector configured to determine a contact resistance of the at least one voltage bus contact based on a first current associated with the voltage bus and a second current associated with the secondary bus As shown in FIG. 1, the serial interface 100 can include a plurality of contacts (or pins) A1 to A12 and B1 to B12. Contact A1, A12, B1 and B12 can be ground contacts. Contacts A2 and A3 (TX1+, TX1−), B2 and B3 (TX1+, TX1−) can form differential pairs in a high speed transmission (TX or transmit end) line or path. Contacts A10 and A11 (RX2−, RX2+), B10 and B11 (RX1−, RX1+) can form differential pairs in a high speed transmission (RX or receive end) line or path. Contacts A4, A9, B4 and B9 can be bus power ($V_{bus}$) contacts. Contacts A5 and B5 (CC1, CC2) can form a configuration channel. The configuration channel (CC) is a low speed communication channel used to communicate configuration parameters. For example, CC can be used to detect attachment of USB ports, to establish source and sink roles for devices (e.g., during power transfer), to establish $V_{bus}$ configuration (e.g., voltage and current), and the like. Contacts A6, A7, B6 and B7 (D+, D−) can form a differential pair in a transmission line or path. Contacts A8 and B8 can form a channel as a side band use (SBU). SBU is not used in normal USB operations. However, SBU can be used in alternate USB modes. For example, in an alternate USB mode, SBU can be used as a video channel, an audio channel and the like. As shown in FIG. 1, the serial interface 100 can further include an outer body or shell 105. The outer body or shell 105 can be configured to help hold (e.g., maintain, house) a mated pair of interfaces. Further, in an implementation of a plug (or male) interface, element 110 can be a printed circuit board on which the contacts are formed which can be configured to be inserted into a corresponding receptacle.

The serial interface 100 can be a USB Type-C connector. The USB Type-C connector is a USB connector type that allows for higher voltage and current capabilities than previous USB connector types. Previous USB connector types allowed for currents up to three amps. USB Type-C standards allow for currents of five amps and possibly up to eight amps or higher. Due to the increased current capabilities, connector contact resistance is a concern because of the potential for increased heat associated with an increase in power dissipation.

As shown in FIG. 1, the serial interface 100 can further include a first short 115 and a second short 120. The first short 115 and the second short 120 can short the bus power ($V_{bus}$) contacts to the side band use (SBU) contacts. The first short 115 and the second short 120 can be used (e.g. by a coupled computing device) to determine a voltage drop across the bus power contacts. The voltage drop across the bus power contacts can be used to determine a contact resistance for the bus power contacts.

The first short 115 and the second short 120 can be a contact to contact short and/or a contact to a corresponding bus, trace or path on the printed circuit board (e.g., element 110) short. The first short 115 and the second short 120 can be a variable short. In other words, the first short 115 and the second short 120 can be switches that when closed form a short between the bus power ($V_{bus}$) contacts to the side band use (SBU) contacts and when open remove the short between the bus power ($V_{bus}$) contacts to the side band use (SBU) contacts. Although the short is shown between the bus power ($V_{bus}$) contacts to the side band use (SBU) contacts, the short can be between the bus power ($V_{bus}$) contacts to another contact (e.g., D+, D−, or TX1+, TX1−, or RX1−, RX1+).

Figure 2:
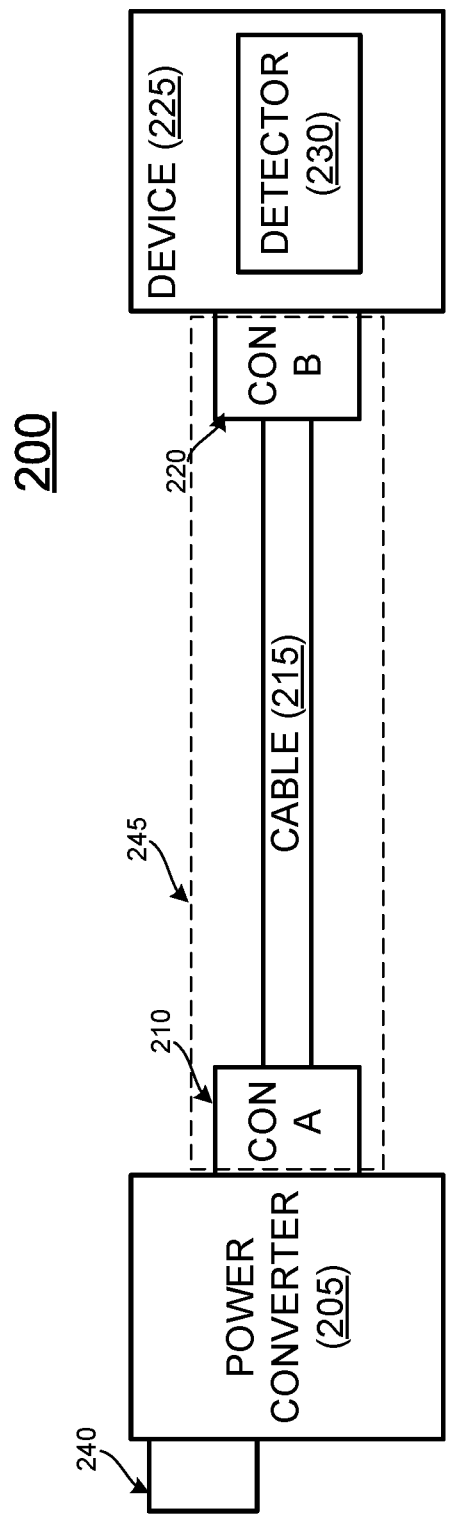
FIG. 2 is a block diagram illustrating a system according to at least one example embodiment.

FIG. 2 is a block diagram illustrating a system according to at least one example embodiment. As shown in FIG. 2, the system 200 can include a power converter 205 and a computing device 225. The power converter 205 can be a travel adapter, a wall charger, a power brick, a battery, a computing device, and the like. Therefore, the power converter 205 includes wall plug 240 used to couple the power converter 205 to a power source (e.g., a wall outlet). The power converter 205 can be configured to provide power (e.g., voltage and current) to the computing device 225 via cable assembly 245.

The computing device 225 can be any computing device (e.g., mobile phone, laptop, smart watch, and the like). The computing device 225 can be configured for fast (e.g., quick, rapid, and the like) charging based on a new USB standard. For example, the computing device 225, if configured with fast charging capability, can be configured to draw a larger amount of power (e.g., more current and/or a higher voltage) from the power converter 205 as compared to older USB standards.

The computing device 225 can be configured to draw a fixed and/or variable current and/or voltage. Connector A 210 and connector B 220 can be a standard based connectors (e.g., USB TYPE-C). The power converter 205 has a corresponding interface that connector A can plug into. The computing device 225 has a corresponding interface that connector B can plug into. The cable 215, connector A and connector B together can be a cable assembly 245.

The computing device 225 includes a detector 230. The detector 230 can be configured to determine a contact resistance associated with connector B exceeds a threshold value. In response to determining the contact resistance associated with connector B exceeds a threshold value, the detector 230 can be configured to cause the current drawn from the power converter 205 to be reduced (e.g., reduce current drawn by computing device 225) thus preventing damage to components of connector B and/or damage to the computing device 225 due to overheating of connector B.

In an example implementation, connector A and connector B can be serial interfaces. Accordingly, connector A (with or without first short 115 and the second short 120) and connector B (with first short 115 and the second short 120) can include the structure of serial interface 100. As such, the power converter 205 can provide power to the computing device 225 using the structure of serial interface 100. For example, the power converter 205 can provide power to the computing device 225 using contact A9, A4 and/or B9, B4 ($V_{bus}$) and A1, A12, B1 or B12 (GND) of the structure of serial interface 100.

Figure 3:
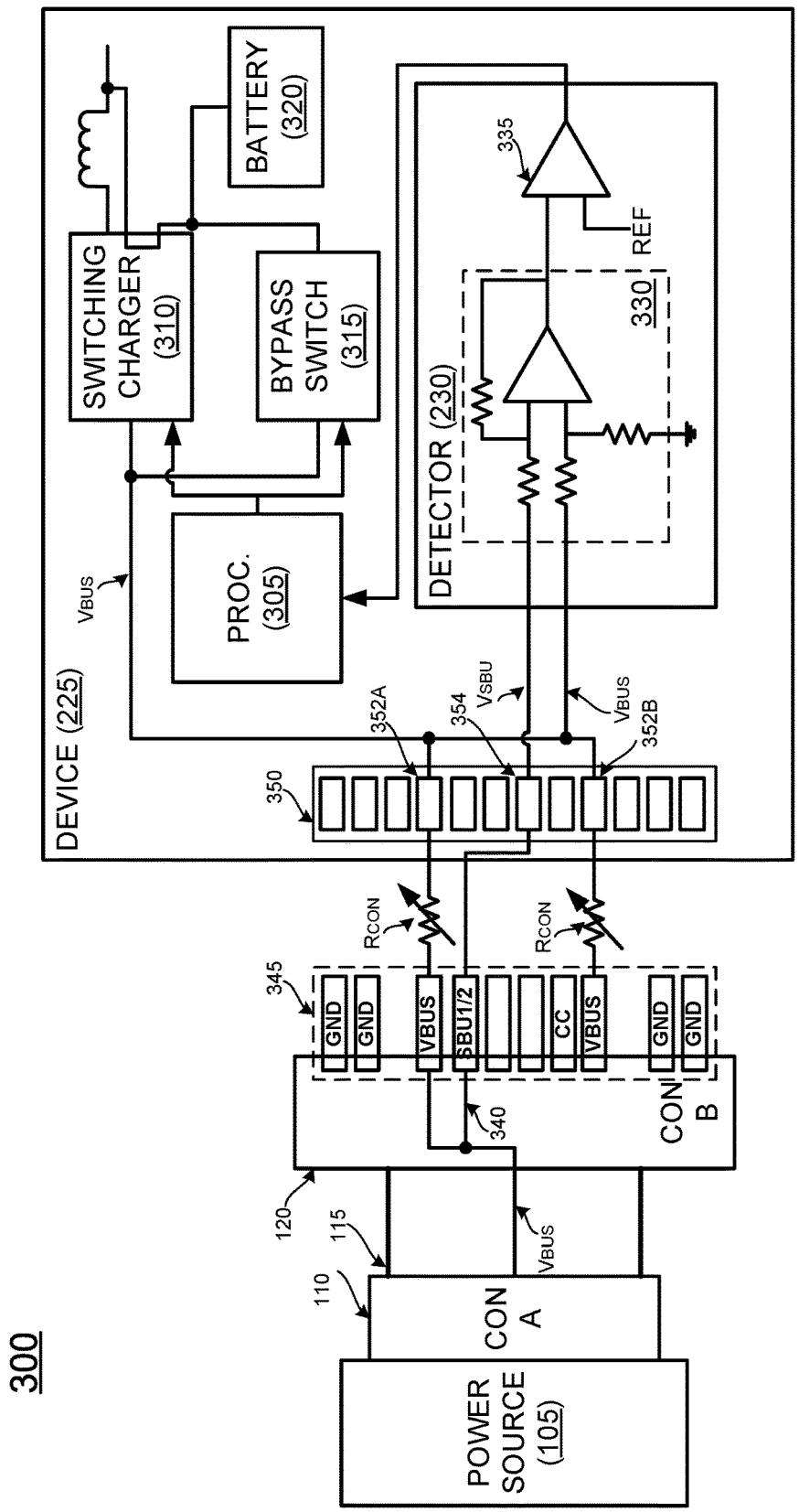
FIG. 3 is another block diagram further illustrating the system of FIG. 2 according to at least one example embodiment.

FIG. 3 is a more detailed view of the components of FIG. 2. As shown in FIG. 3, the computing device 225 further includes a processor 305, a switching charger 310, a bypass switch 315, a battery 320, and an interface 350. The detector 230 includes a current sense amplifier 330 and a comparator 335.

As shown in FIG. 3, the connector B further includes a short 340 and an interface 345. The interface 345 includes a plurality of contacts (e.g., including a first side of a contact or a cable assembly connector side of a contact). The interface 345 can be one gender (e.g., plug or male) of the serial interface 100. The interface 350 includes a plurality of contacts (e.g., including a second side of a contact or a device side of a contact). The interface 350 can be one gender (e.g., receptacle, jack or female) of the serial interface 100. At least one of the plurality of contacts of the interface 350 is a first contact 352A, 352B configured to couple a voltage bus of the power source to a voltage bus of the device. At least one of the plurality of contacts of the interface 350 is a second contact 354 configured to couple the voltage bus of the power source to a secondary bus of the device. The contact resistance between interface 345 and interface 350 is represented by $R_{con}$ (typically 5-10 mΩ).

The short 340 can be contact to contact and/or contact to a corresponding bus or path on the printed circuit board (e.g., element 110). The short 340 can be a variable short. In other words, the short 340 can be a switch that when closed form a short between the bus power ($V_{bus}$) contact to the side band use (SBU) contact and when open remove the short between the bus power ($V_{bus}$) contact to the side band use (SBU) contact. Although the short is shown between the bus power ($V_{bus}$) contact to the side band use (SBU) contact, the short can be between the bus power ($V_{bus}$) contacts to another contact (e.g., D+, D−, or TX1+, TX1−, or RX1−, RX1+).

To charge the battery 320, current passes through the interface 350 along a voltage bus to the switching charger 310 and the bypass switch 315. The processor 305 can be configured to control the charging of the battery 320 by controlling the switching charger 310 and the bypass switch 315. The processor 305 can be configured to determine an amount of current to draw via the voltage bus from the power converter 205 based on a host capability signal received from the power converter 205 (e.g., via the CC path). If the voltage from the power converter 205 is too high for the battery 320, the processor 305 can direct the current through the switching charger 310 to buck (e.g., reduce) the voltage down to a level supported by the battery 320. If the voltage from the power converter 205 is at a level supported by the battery 320, the power converter 205 can direct the current through the bypass switch 315 to the battery 320 (e.g., for fast charging).

The current sense amplifier 330 is configured to directly measure the $V_{bus}$ contact resistance by measuring a voltage drop across the $V_{bus}$ contact (e.g., during high current charging). The current sense amplifier 330 is configured to detect current in the voltage bus or the $V_{bus}$ path and a secondary bus or the $V_{sbu}$ path and convert the currents to an output voltage. The output voltage can be based on (e.g., proportional to) a difference between the current through the $V_{sbu}$ path and the $V_{bus}$ path. The connection between the voltage bus trace or the $V_{bus}$ trace (e.g., a bus or path on the printed circuit board portion of a connector) and the SBU pins (e.g., short 340) is configured to enable the current sense amplifier 330 access to both sides (e.g., computing device 225 side and connector B side) of the $V_{bus}$ connection to determine (e.g., based on the sensed currents and/or voltage drop) the contact resistance. As shown in FIG. 3, $V_{bus}$ on the connector B side is represented by $V_{sbu}$ on the computing device 225 side. $V_{sbu}$ can have a high impedance input to the detector 230. Therefore, short 340 does not cause a current draw from the power converter 205. If the output of the current sense amplifier 330 exceeds the reference (e.g., a threshold voltage or reference voltage) on the comparator 335, the comparator 335 can communicate a signal (e.g., an interrupt signal) to the processor 305. The processor 305 then modifies the charging process.

For example, the modification to the charging process can include lowering the current draw on $V_{bus}$, or terminating the charging process. The current sense amplifier 330 can detect a problem without the waiting for the housing of connector B to reach high temperatures (e.g., through use of a thermistor). In other words, by measuring the voltage drop across the $V_{bus}$ contact the current sense amplifier 330 can detect a high contact resistance and prevent an over temperature condition without the use of a temperature measuring device (e.g., a thermistor). Measuring the voltage drop across the $V_{bus}$ contact also detects the voltage drop faster than measuring the temperature and thus using the current sense amplifier 330 can allow the processor 305 to modify the charging process faster than through use of a temperature measuring device (e.g., a thermistor).

Figure 4:
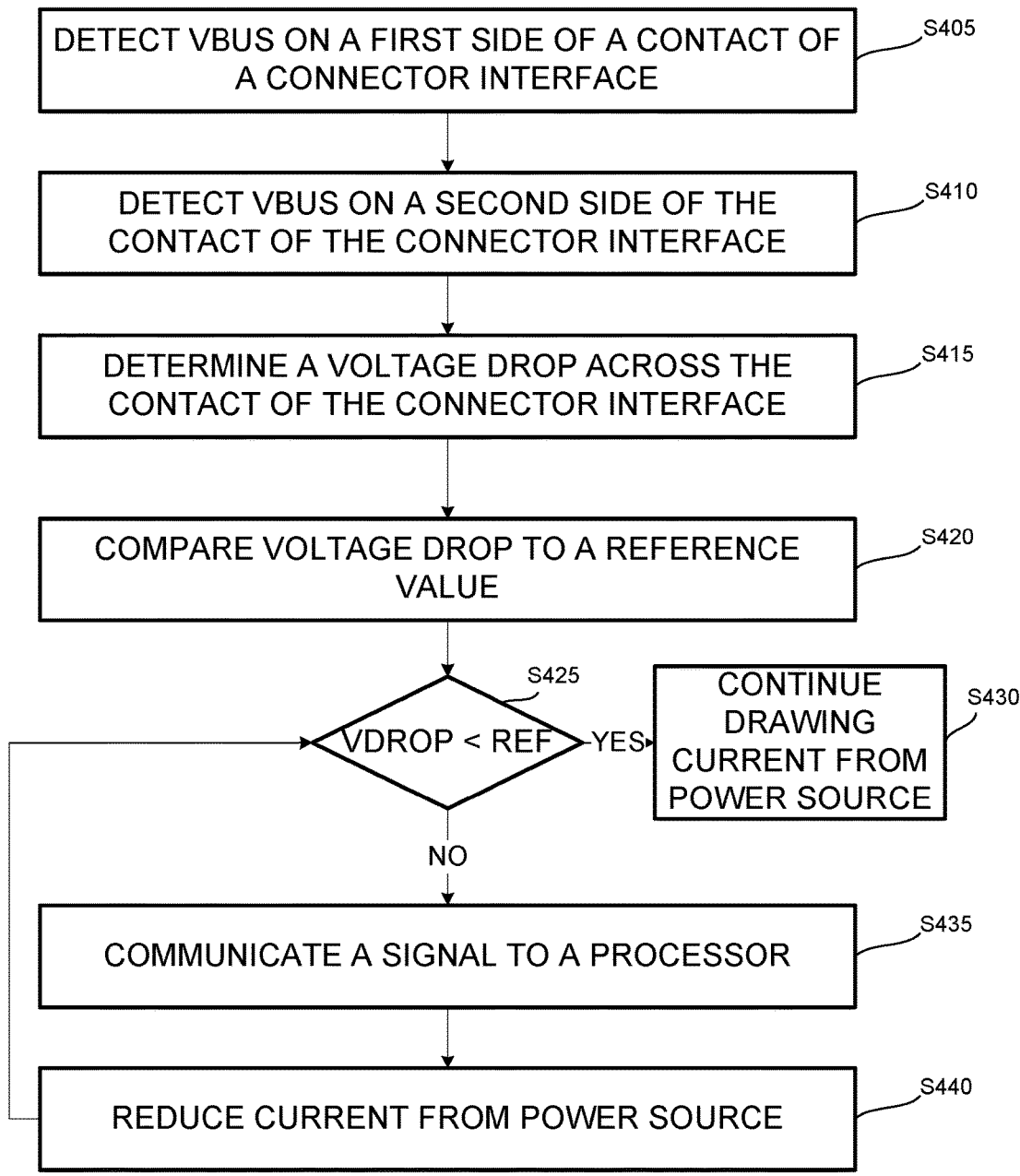
FIG. 4 is a flowchart illustrating a method for preventing an over temperature condition while charging a device according to at least one example embodiment.

FIG. 4 is a flowchart illustrating a method according to at least one example embodiment. The steps described with regard to FIG. 4 may be performed due to the execution of software code stored in a memory and/or a non-transitory computer readable medium (e.g., memory included in computing device 225) associated with an apparatus (e.g., as shown in FIGS. 2 and 3 (described above)) and executed by at least one processor (e.g., processor 305) associated with the apparatus. However, alternative embodiments are contemplated such as a system embodied as a special purpose processor. Although the steps described below are described as being executed by a processor, the steps are not necessarily executed by a same processor. In other words, at least one processor may execute the steps described below with regard to FIG. 4.

FIG. 4 is a flowchart illustrating a method for preventing an over temperature condition while charging a device according to at least one example embodiment. As shown in FIG. 4, in step S405 a bus voltage ($V_{bus}$) on a first (e.g., cable assembly connector) side of a contact of a connector interface is detected. For example, $V_{bus}$ on the connector B side is detected or sensed as an input to the current sense amplifier 330.

In step S410 a bus voltage ($V_{bus}$) on a second (e.g., device) side of the contact of the connector interface is detected. For example, $V_{bus}$ on the computing device 225 side is detected or sensed as an input to the current sense amplifier 330.

In step S415 a voltage drop across the contact of the connector interface is determined. For example, the current sense amplifier 330 can sense a current associated with both $V_{bus}$ on the connector B side (e.g., as $V_{sbu}$) and $V_{bus}$ on the computing device 225 side and output a voltage based on the $V_{bus}$ on the connector B side (e.g., as $V_{sbu}$) and $V_{bus}$ on the computing device 225 side as a voltage drop (or voltage difference) representing the voltage drop across the contact of the connector interface.

In step S420 the voltage drop is compared to a reference (or threshold) value. For example, the voltage drop across the contact of the connector interface can be monitored to determine if it rises above the reference value. In an example implementation, the comparator 335 is coupled to the output of the current sense amplifier 330 and a reference terminal. The comparator 335 is configured to compare the value detected output by the current sense amplifier 330 to a value associated with the reference terminal. Each value can be a voltage value or level.

In step S425 whether the voltage drop is less than the reference value is determined. In response to determining the voltage drop is less than (or equal to) the reference value, in step S430, drawing current from the power source is continued. In response to determining the voltage drop is greater than the reference value, in step S435 a signal is communicated to a processor. For example, the comparator 335 can communicate a signal (e.g., an interrupt signal) to the processor 305.

In step S440 the current draw from the power source is reduced. For example, in response to receiving the interrupt signal, the processor 305 can reconfigure or modify (e.g., send an instruction to) the switching charger 310 to draw less current and/or to the bypass switch 315 to draw less current. The processor 305 can reconfigure the switching charger 310 and/or the bypass switch 315 to at least one of change the maximum current draw, change the amount of current to draw and terminate the current draw.

Although not shown in FIG. 4 described above, if at any time the power converter 205 is disconnected from the computing device 225 the processor 305 can reconfigure the switching charger 310 and/or the bypass switch 315 to stop drawing current. In other words, detachment of the cable 215 can terminate the method steps described with regard to FIG. 4.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device. Various implementations of the systems and techniques described here can be realized as and/or generally be referred to herein as a circuit, a module, a block, or a system that can combine software and hardware aspects. For example, a module may include the functions/acts/computer program instructions executing on a processor (e.g., a processor formed on a silicon substrate, a GaAs substrate, and the like) or some other programmable data processing apparatus.

Some of the above example embodiments are described as processes or methods depicted as flowcharts. Although the flowcharts describe the operations as sequential processes, many of the operations may be performed in parallel, concurrently or simultaneously. In addition, the order of operations may be re-arranged. The processes may be terminated when their operations are completed, but may also have additional steps not included in the figure. The processes may correspond to methods, functions, procedures, subroutines, subprograms, etc.

Methods discussed above, some of which are illustrated by the flow charts, may be implemented by hardware, software, firmware, middleware, microcode, hardware description languages, or any combination thereof. When implemented in software, firmware, middleware or microcode, the program code or code segments to perform the necessary tasks may be stored in a machine or computer readable medium such as a storage medium. A processor(s) may perform the necessary tasks.

Specific structural and functional details disclosed herein are merely representative for purposes of describing example embodiments. Example embodiments, however, may be embodied in many alternate forms and should not be construed as limited to only the embodiments set forth herein.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of example embodiments. As used herein, the term and/or includes any and all combinations of one or more of the associated listed items.

It will be understood that when an element is referred to as being connected or coupled to another element, it can be directly connected or coupled to the other element or intervening elements may be present. In contrast, when an element is referred to as being directly connected or directly coupled to another element, there are no intervening elements present. Other words used to describe the relationship between elements should be interpreted in a like fashion (e.g., between versus directly between, adjacent versus directly adjacent, etc.).

The terminology used herein is for the purpose of describing particular embodiments only and is not intended to be limiting of example embodiments. As used herein, the singular forms a, an, and the are intended to include the plural forms as well, unless the context clearly indicates otherwise. It will be further understood that the terms comprises, comprising, includes and/or including, when used herein, specify the presence of stated features, integers, steps, operations, elements and/or components, but do not preclude the presence or addition of one or more other features, integers, steps, operations, elements, components and/or groups thereof.

It should also be noted that in some alternative implementations, the functions/acts noted may occur out of the order noted in the figures. For example, two figures shown in succession may in fact be executed concurrently or may sometimes be executed in the reverse order, depending upon the functionality/acts involved.

Unless otherwise defined, all terms (including technical and scientific terms) used herein have the same meaning as commonly understood by one of ordinary skill in the art to which example embodiments belong. It will be further understood that terms, e.g., those defined in commonly used dictionaries, should be interpreted as having a meaning that is consistent with their meaning in the context of the relevant art and will not be interpreted in an idealized or overly formal sense unless expressly so defined herein.

Portions of the above example embodiments and corresponding detailed description are presented in terms of software, or algorithms and symbolic representations of operation on data bits within a computer memory. These descriptions and representations are the ones by which those of ordinary skill in the art effectively convey the substance of their work to others of ordinary skill in the art. An algorithm, as the term is used here, and as it is used generally, is conceived to be a self-consistent sequence of steps leading to a desired result. The steps are those requiring physical manipulations of physical quantities. Usually, though not necessarily, these quantities take the form of optical, electrical, or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

In the above illustrative embodiments, reference to acts and symbolic representations of operations (e.g., in the form of flowcharts) that may be implemented as program modules or functional processes include routines, programs, objects, components, data structures, etc., that perform particular tasks or implement particular abstract data types and may be described and/or implemented using existing hardware at existing structural elements. Such existing hardware may include one or more Central Processing Units (CPUs), digital signal processors (DSPs), application-specific-integrated-circuits, field programmable gate arrays (FPGAs) computers or the like.

It should be borne in mind, however, that all of these and similar terms are to be associated with the appropriate physical quantities and are merely convenient labels applied to these quantities. Unless specifically stated otherwise, or as is apparent from the discussion, terms such as processing or computing or calculating or determining or displaying or the like, refer to the action and processes of a computer system, or similar electronic computing device, that manipulates and transforms data represented as physical, electronic quantities within the computer system's registers and memories into other data similarly represented as physical quantities within the computer system memories or registers or other such information storage, transmission or display devices.

Note also that the software implemented aspects of the example embodiments are typically encoded on some form of non-transitory program storage medium or implemented over some type of transmission medium. The program storage medium may be magnetic (e.g., a floppy disk or a hard drive) or optical (e.g., a compact disk read only memory, or CD ROM), and may be read only or random access. Similarly, the transmission medium may be twisted wire pairs, coaxial cable, optical fiber, or some other suitable transmission medium known to the art. The example embodiments are not limited by these aspects of any given implementation.

Lastly, it should also be noted that whilst the accompanying claims set out particular combinations of features described herein, the scope of the present disclosure is not limited to the particular combinations hereafter claimed, but instead extends to encompass any combination of features or embodiments herein disclosed irrespective of whether or not that particular combination has been specifically enumerated in the accompanying claims at this time.

What is claimed is:

1. A device comprising:
   an interface including a plurality of contacts, the interface being configured to couple a power source to the device, the plurality of contacts including:
      at least one first contact configured to couple a voltage bus of the power source to a voltage bus of the device, and
      at least one second contact configured to couple the voltage bus of the power source to a secondary bus of the device; and
   a detector configured to determine a contact resistance of the at least one first contact based on a first current associated with the voltage bus and a second current associated with the secondary bus.

2. The device of claim 1, wherein the detector is further configured to:
   generate a voltage drop generated based on a current associated with the voltage bus and a current associated with the secondary bus;
   determine if the voltage drop exceeds a reference value; and
   in response to determining the voltage drop exceeds the reference value, trigger a reduction of a current drawn from the power source.

3. The device of claim 1, wherein the detector includes:
   a current sense amplifier configured to generate a voltage drop generated based on a current associated with the voltage bus and a current associated with the secondary bus; and
   a comparator configured to:
      compare the voltage drop to a reference value, and
      communicate a result of the comparing of the voltage drop to the reference value to a processor.

4. The device of claim 1, further comprising:
   a battery;
   a switching charger configured to reduce a voltage to a level supported by the battery;
   a bypass switch configured to bypass the switching charger; and a processor configured to select the switching charger or the bypass switch based on a voltage associated with the power source.

5. The device of claim 1, wherein the interface uses a universal serial bus (USB) TYPE-C standard.

6. The device of claim 1, further comprising:
a processor configured to:
determine an amount of current to draw from the power source based on a capability signal received from the power source,
instruct one of a switching charger or a bypass switch to draw the amount of current from the power source, and
instruct one of the switching charger or the bypass switch to reduce the amount of current to draw from the power source based on a communication received from the detector.

7. The device of claim 1, further comprising:
a processor configured to:
instruct one of a switching charger or a bypass switch to draw current from the power source, and
instruct one of the switching charger or the bypass switch to terminate the drawing of the current from the power source based on a communication received from the detector.

8. The device of claim 1, the secondary bus includes a high impedance input to the detector.

9. The device of claim 1, further comprising:
a processor configured to cause a coupling and decoupling of a voltage bus trace associated with the voltage bus of the power source to the secondary bus of the device.

10. A method comprising:
detecting a bus voltage on a first side of a contact of a connector interface;
detecting the bus voltage on a second side of the contact of the connector interface;
determining a voltage drop based on the bus voltage on the first side of the contact and the bus voltage on the second side of the contact; and
reducing a current drawn from a power source based on the voltage drop.

11. The method of claim 10, further comprising:
comparing the voltage drop to a reference voltage.

12. The method of claim 10, wherein the voltage drop corresponds to a contact resistance of the contact.

13. The method of claim 10, wherein the connector interface uses a universal serial bus (USB) TYPE-C standard.

14. The method of claim 10, wherein the contact is a first contact, the method further comprising:
one of coupling or decoupling the bus voltage to a second contact on the second side of the contact.

15. The method of claim 10, further comprising:
comparing the voltage drop to a reference value, and
communicating a result of the comparing of the voltage drop to the reference value to a processor.

16. The method of claim 10, determining if the voltage drop exceeds a reference value; and
in response to determining the voltage drop exceeds the reference value, triggering the reducing of the current drawn from the power source.

17. The method of claim 10, determining if the voltage drop exceeds a reference value; and
in response to determining the voltage drop exceeds the reference value, terminating the current draw from the power source.

18. The method of claim 10, further comprising:
selecting one of a switching charger or a bypass switch for use in charging a battery based on a voltage associated with the power source, wherein
the switching charger is configured to reduce a voltage to a level supported by the battery, and
the bypass switch is configured to bypass the switching charger.

19. A non-transitory computer-readable storage medium having stored thereon computer executable program code which, when executed on a computer system, causes the computer system to perform steps comprising:
detecting a bus voltage on a first side of a contact of a connector interface;
detecting the bus voltage on a second side of the contact of the connector interface;
determining a voltage drop based on the bus voltage on the first side of the contact and the bus voltage on the second side of the contact; and
reducing a current drawn from a power source based on the voltage drop.

20. The method of claim 10, wherein the voltage drop corresponds to a contact resistance of the contact.

* * * * *